Figure 1:
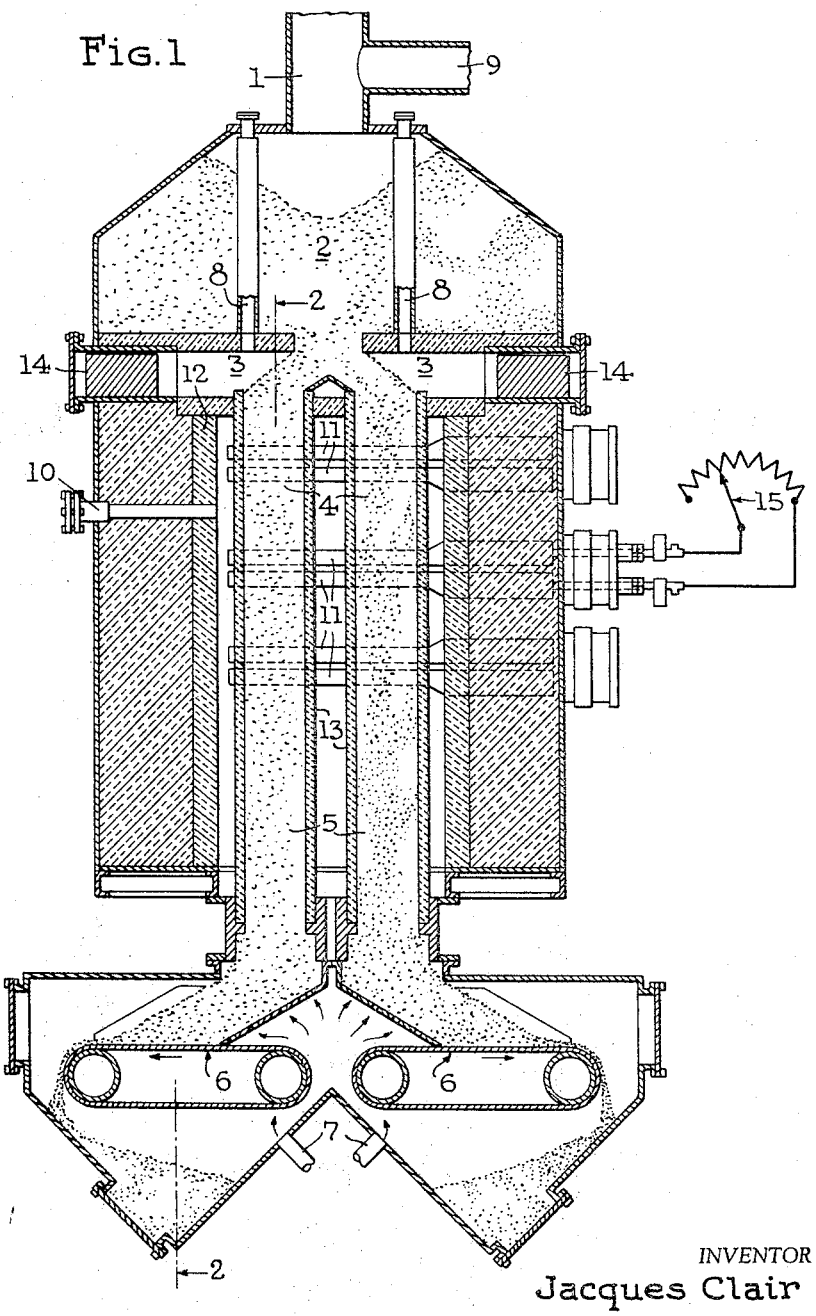

INVENTOR
Jacques Clair
BY Raphael Tourner
ATTORNEY

May 1, 1962
J. CLAIR
3,032,398
PROCESS AND FURNACE FOR THE CONTINUOUS
PRODUCTION OF ALUMINUM NITRIDE
Filed May 13, 1958
2 Sheets-Sheet 2
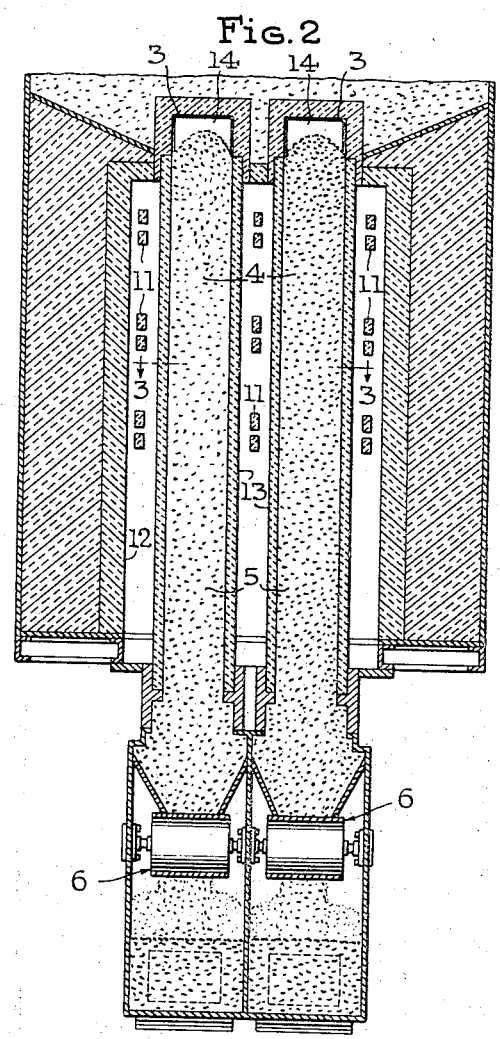
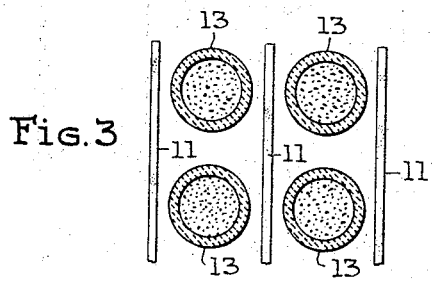
INVENTOR
Jacques Clair
BY Raphael Tourover
ATTORNEY United States Patent Office 3,032,398
Patented May 1, 1962

3,032,398
PROCESS AND FURNACE FOR THE CONTINUOUS PRODUCTION OF ALUMINUM NITRIDE
Jacques Clair, Grenoble, France, assignor to Pechiney, Compagnie de Produits Chimiques et Electrometallurgiques, Paris, France, a corporation of France
Filed May 13, 1958, Ser. No. 734,935
Claims priority, application France May 16, 1957
4 Claims. (Cl. 23—192)

The present invention which is the result of applicant's researches relates to a process and furnace for the continuous production of aluminum nitride having a low aluminum oxide and carbon content.

Aluminum nitride is obtained by reacting nitrogen with a mixture of aluminum oxide and carbon which has been raised to a high temperature. In order to obtain a practically complete conversion of the aluminum oxide to the nitride, it is important that the temperature does not exceed 1750° C., while insuring sufficient nitrogen flow at all times through the entire space filled with the charge of the raw solid materials. Any overheating involves volatilizations which impair the efficiency and are detrimental to the quality of the end product, and may cause sintering which prevents the continuous operation of the furnace. Lack of nitrogen, even locally, brings about fusion with partial sintering of the charge, so that the completion of the nitriding operation becomes impossible.

Moreover, these local agglomerations hinder the downward movement of the materials which movement is necessary to the continuous operation of the nitriding furnace.

In order to facilitate the distribution of nitrogen through the entire volume of the charge, one has been led to agglomerate e.g. pelletize the preliminarily finely comminuted aluminum oxide and carbon. Such agglomerates must be porous enough to permit the nitrogen to pass to the center (core) thereof. On the other hand, they must maintain their pelletized condition during and after nitriding because it is important to prevent any dust formation which would interfere with the nitrogen flow and its proper distribution through the charge and which could give rise, through sintering, to agglomerates preventing a continuous downward movement of the materials.

To comply with these requirements, applicant has deemed it necessary to use as a binder in the preparation of the pellets a certain quantity of aluminate of lime which prevents their disintegration during the entire nitriding process. But the calcium in the aluminate is volatilized and condenses outside the nitriding zone at a temperature between 1200° and 1300° C. in the form of very hard crusts containing carbon and calcium. These crusts present the risk of hindering the proper downward flow of the aluminum oxide-carbon pellets or agglomerates.

The process and furnace which are the object of the present invention avoid these drawbacks and enable the nitriding to be carried out as a continuous process. It consists of tight vertical retorts inside which the aluminum oxide-carbon pellets i.e. particulate material flow by gravity from top to bottom, and the nitrogen flows upwards countercurrent to the pellets.

These pellets are heated to a controlled temperature; for example, by means of electrical resistors out of contact with the charge. At the top of the retorts, there is disposed an expansion chamber maintained at a temperature between 1200° and 1300° C. and which is provided to receive undesired condensations.

The accompanying FIGURES 1, 2 and 3 represent a preferred embodiment of a furnace for carrying out the invention; however, the invention is not limited thereto.

FIGURE 1 shows a vertical sectional view of the furnace.
FIGURE 2 shows a vertical section of the retorts along line 2—2 of FIGURE 1.
FIGURE 3 shows a transverse section along line 3—3 of FIGURE 2.

The furnace consists of vertical, tight graphite columns or vessels 13 constituting reaction chambers having uniform cross sections. The pellets flow from top to bottom, while nitrogen flows countercurrent thereto. Thus, the pellets charged in at 1 pass successively through three zones as follows: a preheating zone 2 which may merely be self-heat-insulated by the pellets themselves; a nitriding zone 4, and a cooling zone 5.

The pellets are drawn off by any desired continuous extraction device 6, enclosed inside a tight casing. The nitrogen enters at 7, the gases are evacuated at 9.

The entire cross-section where the nitrogen flows is filled with the charge. The continuous downward movement of the pellets prevents channeling i.e. creation of preferred paths of flow for the gases. Cylindrical chambers are to be preferred, as it facilitates their own sealing as well as that of the joint between the chambers and extraction lock. However, rectangular chambers may likewise be used, care being taken to distribute the nitrogen across the entire cross section at the bottom of the chambers.

Heating is secured by graphite pins or resistors 11, placed between the chambers. There is obtained thereby excellent uniformity of temperature and all contact between the reactants and the heating means, whereby all superheating is avoided.

The resistors in each horizontal plane are connected electrically in series; the various series thus formed are electrically independent and their voltage can be varied as by means, diagrammatically shown at 15, to enable a precise control of temperature, indicated by the pyrometer 10, along the nitriding zone.

The enclosure which contains the chambers and resistors are suitably heat insulated, for example, and in the first place, by means of a nitride lining 12.

At the outlet of the reaction zone, the furnace comprises expansion chambers or zones 3, which are readily accessible by means of plugs 14 which extend on the exterior. By suitable adjustment of the upper group of resistors 11, the temperature of the refractory walls of these chambers is maintained between 1200° and 1300° C., the temperature being checked by sight holes 8. By reason of such temperature control and the appreciable reduction of the gas speed in the said expansion chambers (zones), condensates (originating) from the volatilized lime are deposited on these chamber walls, whence they may be removed easily from the exterior without disturbing the furnace operation.

The accompanying figures represent a four column furnace, but the apparatus is not limited to the use of this number of columns; indeed, the invention embraces the coupling of several similar units.

The process is carried out at atmospheric pressure.
I claim:
1. Process for the continuous production of aluminum nitride comprising the following steps: forming particulate material composed of aluminum oxide, carbon and a calcium aluminate binder; continuously passing the particulate material downward by gravity into an elongated, externally heated reaction zone wherein the particulate material is heated uniformly to a temperature not in excess of about 1750° C.; continuously passing a current of nitrogen upwards in said zone countercurrent to the descending heated particulate material and thereby forming aluminum nitride; continuously removing and recovering the formed aluminum nitride at a point below the lower end of said reaction zone; passing reaction gases from the upper end of the reaction zone through an expansion zone maintained at temperature conditions wherein any calcium contained in said reaction gases will be condensed and deposited; removing the condensed deposit from said expansion zone, and continuously removing gases from the top of the expansion zone.

2. Process according to claim 1, wherein the expansion zone is maintained at a temperature of 1200°–1300° C.

3. Furnace for the continous production of aluminum nitride from particulate material comprising agglomerated aluminum oxide and carbon comprising in combination: at least one elongated, vertical gas-tight vessel within said furnace; a plurality of distributed electrical external heating means for said vessel; an inlet for particulate material at the upper end of said vessel; an inlet for nitrogen at the lower end of said vessel; an outlet for the formed aluminum nitride; means for removing said aluminum nitride located at the lower end of said vessel; an outlet for the reaction gases at the upper end of said furnace; an expansion chamber within the upper end of said furnace in immediate communication with the upper end of said vessel extending substantially horizontally outwardly from said vessel, at least a portion of said chamber being located outside of the normal direction of flow of the reactants whereby volatilized metallic constituents in the reaction gases are condensed therein; and access means for removing condensed metallic constituents from the expansion chamber accessible from the exterior of said furnace without disturbing furnace operation.

4. A furnace according to claim 3, provided with a plurality of said vessels uniformly disposed within the furnace, and wherein the heating means comprise a plurality of resistors distributed lengthwise of the vessels, and means for independently controlling said resistors, whereby the temperature of various sections of the vessels can be independently regulated.

References Cited in the file of this patent

UNITED STATES PATENTS

| | | |
|---|---|---|
| 1,274,797 | Shoeld | Aug. 16, 1918 |
| 1,344,153 | Shoeld | Feb. 22, 1920 |
| 1,393,372 | Hoopes | Oct. 11, 1921 |

FOREIGN PATENTS

| | | |
|---|---|---|
| 517,867 | Great Britain | Feb. 12, 1940 |
| 455,441 | Canada | Mar. 29, 1949 |